United States Patent

Masel et al.

[11] Patent Number: 5,974,029
[45] Date of Patent: Oct. 26, 1999

[54] METHOD FOR LIMITING THE TRANSMISSION OF DATA GENERATED BY A DATA SOURCE

[75] Inventors: Jonathan Masel, Kfar Saba, Israel; Marc Le Gourrierec, Paris, France

[73] Assignee: Inverness System Ltd., Kfar Saba, Israel

[21] Appl. No.: 08/740,669

[22] Filed: Oct. 31, 1996

[51] Int. Cl.$^6$ ........................................... H04L 12/56
[52] U.S. Cl. ..................................... 370/232; 370/253
[58] Field of Search ........................... 370/229, 230, 370/231, 232, 233, 234, 235, 236, 237, 238, 248, 252, 253, 395, 396, 398, 465, 468, 477

[56] References Cited

U.S. PATENT DOCUMENTS

| | | | |
|---|---|---|---|
| 5,253,247 | 10/1993 | Hirose | 370/232 |
| 5,280,483 | 1/1994 | Kamoi | 370/232 |
| 5,357,507 | 10/1994 | Hughes | 370/234 |
| 5,448,567 | 9/1995 | Dighe | 370/233 |
| 5,455,826 | 10/1995 | Ozveren et al. | 370/232 |
| 5,457,687 | 10/1995 | Newman | 370/232 |
| 5,463,620 | 10/1995 | Sriram | 370/412 |
| 5,497,375 | 3/1996 | Hluchyj et al. | 370/232 |
| 5,579,302 | 11/1996 | Banks | 370/397 |
| 5,579,312 | 11/1996 | Regache | 370/397 |
| 5,629,937 | 5/1997 | Hayter et al. | 370/233 |
| 5,649,110 | 7/1997 | Ben-Nun et al. | 370/351 |
| 5,675,384 | 10/1997 | Ramamurthy et al. | 348/405 |
| 5,675,576 | 10/1997 | Kalampoukas et al. | 370/232 |
| 5,699,346 | 12/1997 | VanDervort | 370/223 |

*Primary Examiner*—Chi H. Pham
*Assistant Examiner*—Kwang B. Yao
*Attorney, Agent, or Firm*—McDermott, Will & Emery

[57] ABSTRACT

A novel method of calculating and enforcing user traffic parameters on an ATM network is disclosed. The method of the present invention provides very accurate calculation results for the amount of bandwidth consumed by an application. The method can be utilized to limit both the average traffic rate and the maximum burst rate of an application. The disclosed method achieves high efficiency by requiring minimal intervention from a processor and by requiring only additions and subtractions with no multiplications or divisions for its core operations.

3 Claims, 2 Drawing Sheets

METHOD FOR LIMITING THE TRANSMISSION OF DATA GENERATED BY A DATA SOURCE

FIELD OF THE INVENTION

The present invention relates generally to data transmission and more particularly to a method of enforcing user traffic parameters on a network.

BACKGROUND OF THE INVENTION

Currently, asynchronous transfer mode (ATM) networks are becoming more and more commonplace in environments that require high speed data networking and switching facilities. ATM's small cell size of 53 bytes facilitates very fast hardware switch fabrics. ATM is suitable for fast switching of any type data source such as data, video, audio, etc.

For an application to transmit data onto an ATM network it is required to segment that data into 53 byte cells. This may be done in either hardware or in software, in the case of slower communication lines. In many instances, end users of the ATM network maintain contractual agreements with the ATM service provider. Typically, as part of these contractual agreements, applications are expected to be restricted in the average rate (i.e., speed) of data that may be generated and transmitted. In addition, applications may be allocated a certain number of cells that may be transmitted at a higher (e.g., burst) rate.

The average data rate allocated by any network should not exceed its operating capacity. The maximum burst rate is required in order to put a limit on the amount of bandwidth consumed by applications that may exceed this capacity. Another parameter critical to an application's configuration is the variance or delay between successive cells. This is called the cell delay variance (CDV). The CDV is a measure of the changes in delay experienced by other applications sharing the same ATM line. The CDV is required since multiple connections on the same line compete against each other for bandwidth. If one application is allowed to burst for a long period of time, it may starve other applications for bandwidth until it completes its transmission. For many types of applications (e.g., voice) it is critical that the longest delay between transmission slots be known. The longest delay can be guaranteed only if the maximum burst of each application is limited to a known value.

Since ATM data traffic is transmitted in 53 byte cells, which at ATM data rates is a relatively very short time, traffic pattern calculations (i.e., usage and burst) need to be very efficient. For example, at a data rate of only 2 Mbps, traffic pattern calculations must be made approximately every 220 microseconds, which is the time for the transmission of a single cell. At much higher data rates, such as 155 Mbps and 625 Mbps, the time for traffic pattern calculations decreases substantially.

Proposed algorithms for enforcing transmission rates are based on what is called a leaky bucket algorithm. Using this algorithm, data is stored in a buffer and the buffer is depleted at given time intervals. Most implementations of this algorithm require the controller that is managing the process to check the buffer at very close time intervals that are based on the time taken to transmit a single cell. It also requires the controller to calculate the precise time at which the next cell will be transmitted over the connection and only allow the cell to be transmitted at that particular time. Carrying out this requirement often involves numerous calculations which include multiplications and divisions. These are time consuming to carry out, especially in the case, for example, when bandwidth is not evenly divided. For example, one application connection may have 17% of the total bandwidth allocated to it and another application connection may have 23% allocated, etc. Calculating the precise time for next cell transmission in either case will require multiplication and division of the cell time interval.

SUMMARY OF THE INVENTION

Accordingly, it is an object of the present invention to provide a method for enforcing traffic management parameters on a network that overcomes the disadvantages of the prior art solutions.

Another object of the present invention is to provide a method for enforcing traffic management parameters on a network that yields accurate calculations of bandwidth consumption by an application which can be utilized to limit the application's average traffic rate and its maximum burst rate.

It is another object of the present invention to provide a method for enforcing traffic management parameters on a network that yields accurate calculations of bandwidth consumption by an application while requiring minimal intervention from a controller.

Yet another object of the present invention is to provide a method for enforcing traffic management parameters on a network that yields accurate calculations of bandwidth consumption by an application whose core operations are only additions and subtractions.

A novel method of calculating and enforcing user traffic parameters on an ATM network is disclosed. The method of the present invention provides very accurate calculation results for the amount of bandwidth consumed by an application. The method can be utilized to limit both the average traffic rate and the maximum burst rate of an application. The disclosed method achieves high efficiency by requiring minimal intervention from a processor and by requiring only additions and subtractions with no multiplications or divisions for its core operations.

There is thus provided in accordance with a preferred embodiment of the present invention a method of limiting the transmission rate of data generated from a data source, packaged in fixed sized cells, to a data rate RATE and to a burst rate BURST, both RATE and BURST expressed as a multiple of the time to transmit one of the cells, the method comprising the steps of setting a variable, CREDIT, equal to its previous value plus the difference between a current clock time $T_{NOW}$ and a previous clock time $T_{LAST}$, the difference expressed in units of the time to transmit one of the cells, setting the variable CREDIT to the minimum of the variable CREDIT and the burst rate BURST, comparing the variable CREDIT to the data rate RATE, if the variable CREDIT is greater than or equal to the data rate RATE: transmitting one data cell, subtracting the data rate RATE from the variable CREDIT, setting the previous clock time $T_{LAST}$ equal to the current clock time $T_{NOW}$, determining whether there is more data to be transmitted and if there is more data to be transmitted, repeating the step of comparing.

Further, the data rate RATE is set to the inverse of the proportion of the total bandwidth allocated to the transmission of data from the data source and the burst rate BURST is determined by multiplying the RATE by the maximum number of consecutive cells that are permitted to be transmitted.

There is also provided in accordance with a preferred embodiment of the present invention a method of limiting the transmission rate of data generated from a data source, packaged in fixed sized cells, to a data rate RATE and to a burst rate BURST, both RATE and BURST expressed as a multiple of the time to transmit one of the cells, the method comprising the steps of setting a variable CREDIT to the minimum of the accumulated time since the last transmission and the BURST rate, transmitting cells while the variable CREDIT is greater than or equal to the data rate RATE and decrementing the variable CREDIT by the value RATE after each the cell is transmitted.

BRIEF DESCRIPTION OF THE DRAWINGS

The invention is herein described, by way of example only, with reference to the accompanying drawings, wherein.

DETAILED DESCRIPTION OF THE INVENTION

The description of the present invention and an illustrative example are presented within the context of ATM networking. The use of ATM networking as an example, however, in no way limits the scope of the present invention to other types of networks. The method of the present invention is applicable to any situation wherein data flow generated from a data source needs to be regulated to conform to preset parameters of normal data rate and burst rate.

Notation Used Throughout

The following notation is used throughout this document:

| Symbol | Description |
| --- | --- |
| CELL | the number of ticks to transmit a single data cell |
| RATE | the average rate at which the connection may generate data |
| BURST | the maximum number of cells the connection may generate at the high (burst) rate |
| CREDIT | a variable representing the amount of time available to be used by ('owed' to) the connection |
| $T_{NOW}$ | the current time in units of CELL |
| $T_{LAST}$ | the time the last cell was transmitted in units of CELL |

Cell Scheduling

Figure 1:
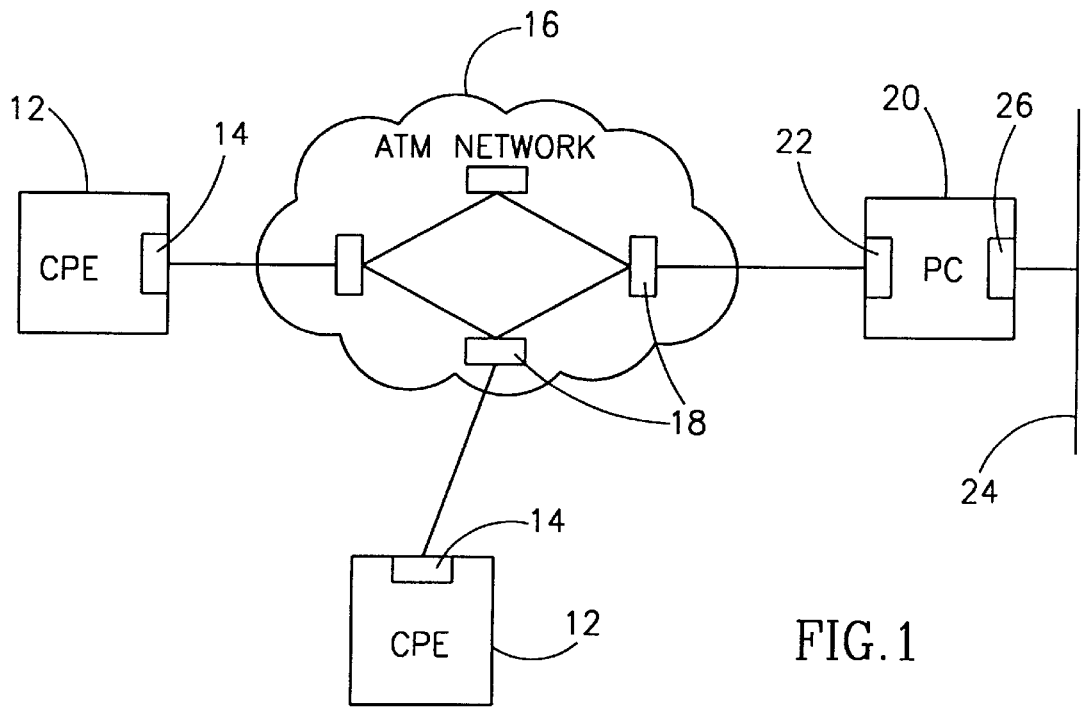
FIG. 1 is a high level block diagram illustrating an example network within which the method of the present invention is adapted to operate.

A high level block diagram illustrating an example network within which the method of the present invention is adapted to operate is shown in FIG. 1. An ATM network 16 is shown comprising four switches 18 connected to each other in a ring fashion. The ATM network shown is presented only for illustration purposes and may comprise any number of configurations without limiting the scope of the present invention. Coupled to separate switches are customer premise equipment (CPE) 12 via ATM edge device 14. In addition, a personal computer (PC) 20 is coupled to a switch via ATM edge device 22. The PC 20 is also coupled to a local area network (LAN) 24 via network interface card (NIC) 26.

Figure 2:
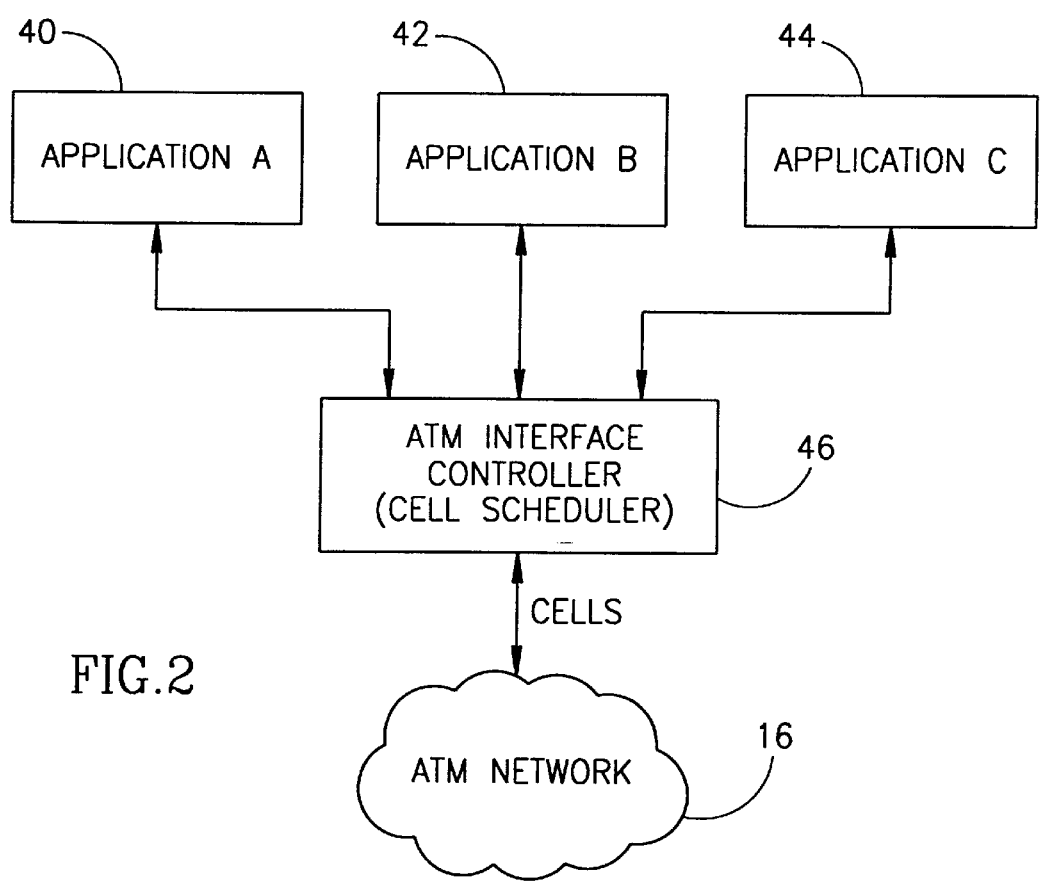
FIG. 2 is a high level data flow diagram illustrating the flow of cell traffic from a plurality of applications to a network being throttled by a cell scheduler adapted to perform the method of the present invention.

The method of the present invention is adapted to operate within the ATM edge devices 14, 22. More specifically, it is to operate within the ATM interface controller that performs the function of cell scheduling. A high level data flow diagram illustrating the flow of ATM cell traffic through a cell scheduler is shown in FIG. 2. ATM interface controller 46 is an integral part of the ATM edge device 14, 22 (FIG. 1) performing a cell scheduling function. A plurality of applications, application A 40, application B 42 and application C 44, are coupled to the ATM interface controller 46. The applications A, B and C generate cells that are to be transmitted over the ATM network 16 to various destinations. A major function of the ATM interface controller is to control the flow of cells from the applications to the ATM network. The controller must enforce traffic management parameters that have been setup by the ATM network. Cells generated by the applications must be throttled so as not to exceed the capacity of the line connection.

Traffic Management Parameter Enforcement

Figure 3:
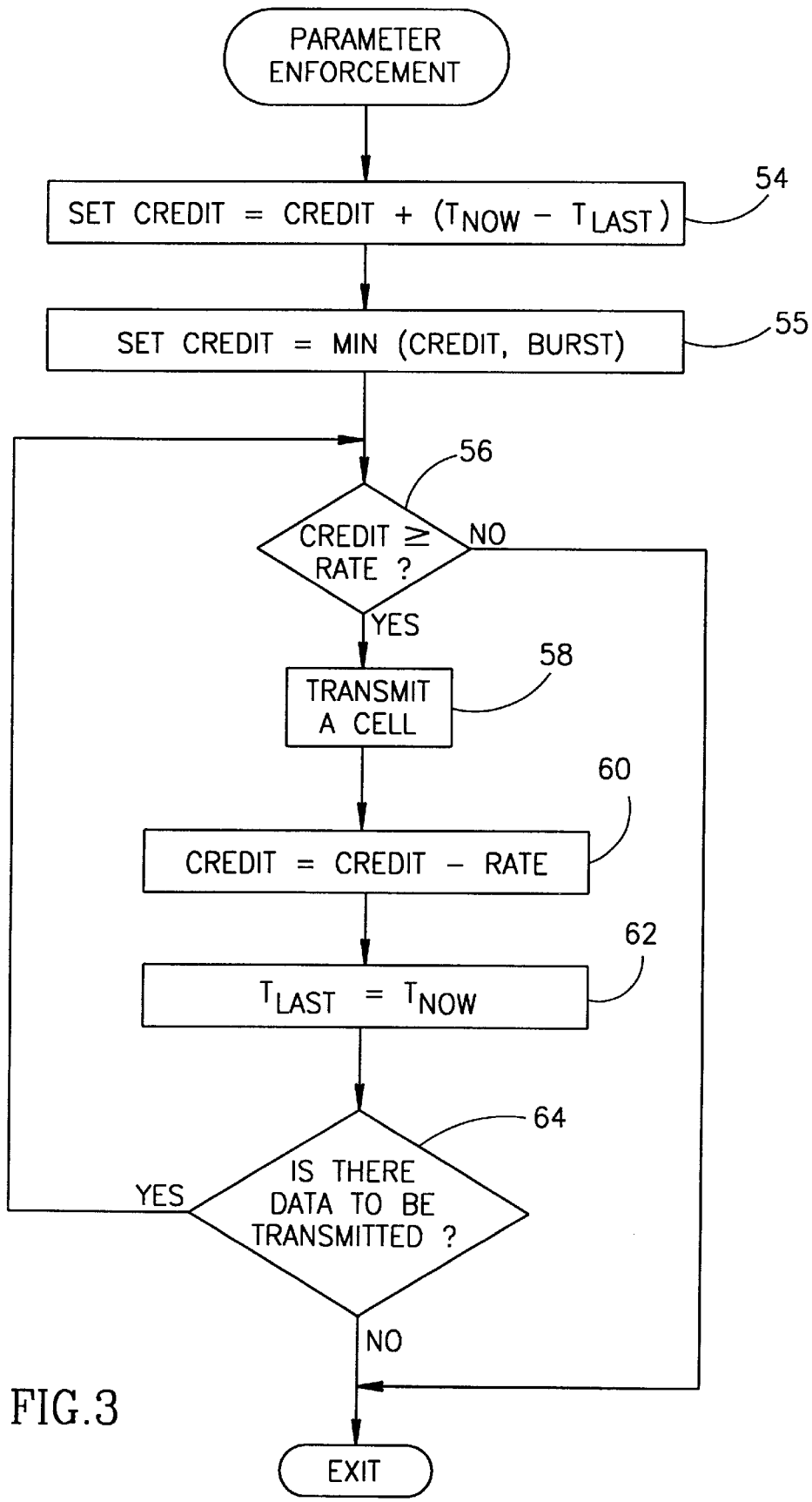
FIG. 3 is a high level logic flow diagram illustrating the traffic management method of the present invention.

The method of enforcing traffic management parameters taught by the present invention will now be described. A high level logic flow diagram illustrating the traffic management method of the present invention is shown in FIG. 3. The method disclosed is based on a time unit that is determined for a particular system. Typically it is measured in nanoseconds and referred to as a tick. For example, in a typical 25 MHz system the time unit or tick may be set to 40 ns. The number of ticks necessary to transmit onto the line connection a single ATM cell of 53 bytes is then determined. This number is referred to as the quantity CELL. These calculations can be performed once during start-up since they are a function of known constants.

Two additional parameters are defined for each connection. Note that a line to the ATM network may service more than one connection. A parameter referred to as RATE defines the average rate at which the connection is permitted to generate data. In addition, the parameter BURST defines the maximum number of consecutive cells allowed to be transmitted for the connection.

The quantity RATE can be determined by taking the inverse of the proportion of the total bandwidth allocated to that connection. For example, if a connection is granted ½ of the total bandwidth, RATE is then set to CELL * 2. If a connection is granted ¼ of the total bandwidth, for example, RATE is then set to CELL * 4. Since the quantity CELL is typically a relatively large number, the quantity RATE can be set using integer arithmetic without affecting the accuracy of the method. Note that RATE can be calculated once during start-up.

The quantity BURST can be determined by multiplying the value of RATE by the maximum number of consecutive cells that are permitted to be transmitted. For example, if it is desired to limit data transmission to the network for a particular connection to five consecutive cells, the quantity BURST is set to RATE * 5.

The method requires that one variable called CREDIT be maintained which holds the current amount of transmission time available to be used by (i.e., 'owed' to) the connection. In addition, the method requires a free running timer or clock that can be read with a resolution at least as fine as the quantity CELL. Note that the time or clock does not interrupt the system in any way and is only used to read the current system time in units of CELL. The quantity $T_{NOW}$ represents the current time in units of CELL and $T_{LAST}$ represents the time the previous cell was transmitted also in units of CELL.

With reference to FIG. 3, the method of the present invention will now be described in more detail. The method is performed each time an application has data that is to be transmitted through the connection to the ATM network. In addition, it is assumed that during start-up, the variable CREDIT was set to the value of RATE. First, the amount of time from the transmission of the previous cell is added to CREDIT (step 54), which can be expressed as:

$$\text{CREDIT} = \text{CREDIT} + (T_{NOW} - T_{LAST})$$

The value of CREDIT is then set to the lower of itself or the quantity BURST (step 55). This step limits the value of CREDIT to the BURST value after long periods of time between transmissions. The value of CREDIT is then compared to the value of RATE (step 56). If the value of CREDIT is insufficient to transmit a cell, the method terminates. If CREDIT is greater than or equal to RATE a cell is transmitted (step 58). Subsequently, CREDIT is decremented by the value of RATE (step 60) and $T_{LAST}$ is set to $T_{NOW}$ (step 62). It is then checked to see whether there is more data to be transmitted (step 64). If there is more data to send, the process loops back to step 56. If there is no additional data to send, the process terminates.

This method functions to limit the average transmission rate to the value of RATE and the maximum burst size to the value of BURST. In addition, it is very efficient in that it involves only integer additions, subtractions and comparisons. Despite the integer arithmetic, the method is very accurate. Also, since the resolution units of the variable CELL correspond to a very small portion of the total capacity of the line, almost any proportion of the bandwidth can be divided among the connections. This allows for a very accurate determination of the CDV of the system.

To illustrate the principles of the method of the present invention, the following example is presented. Assume that two applications, applications A and B, both generate data to be transmitted over the ATM network. Assume the data is packaged into 53 byte cells with the cells originating from application A are referenced A1, A2, A3, etc. Similarly, the cells generated from application B are referenced B1, B2, B3, etc. Using the method illustrated in FIG. 3, the table below is presented which shows, as a function of time, the particular cell actually transmitted by the cell scheduler and the corresponding values of the variable CREDIT and $T_{LAST}$ for applications A and B. The parameters are chosen to be the following:

CELL=1
RATE=2 (applications A and B share the line equally, each using ½ the bandwidth)
BURST A=2
BURST B=3

| TIME | <1 | 1 | 2 | 3 | 4 | 5 | 6 | 7 | 8 | 9 |
|---|---|---|---|---|---|---|---|---|---|---|
| CELL TRANSMITTED | | A1 | A2 | B1 | B2 | B3 | A3 | A4 | B4 | A5 |
| CREDIT A | 4 | 2 | 0 | 1 | 2 | 3 | 2 | 0 | 1 | 1 |
| $T_{LAST}$A | X | 1 | 2 | 2 | 2 | 2 | 6 | 7 | 7 | 9 |
| CREDIT B | 6 | 6 | 6 | 4 | 2 | 0 | 1 | 2 | 1 | 2 |
| $T_{LAST}$B | X | X | X | 3 | 4 | 5 | 5 | 7 | 8 | 9 |

In the example presented in the table above, it is apparent that both applications A and B are limited to their respective burst rates. Note that application B is limited to sending only one cell in time tick number 8 because it enters tick 8 with a CREDIT of 3. Thus, only one cell can be transmitted.

The implementation may be extended to limit the rate at which the bursty cells will be sent (in the algorithm present above, this was not done for illustration sake, so all accumulated cells are sent consecutively). This is achieved by defining another parameter called BURST_RATE which is set to the minimum number of ticks between any two consecutive cells.

While the invention has been described with respect to a limited number of embodiments, it will be appreciated that many variations, modifications and other applications of the invention may be made.

What is claimed is:

1. A method of limiting the transmission rate of data generated from a data source, packaged in fixed sized cells, to a data rate RATE and to a burst rate BURST, the values of both RATE and BURST rates expressed as a multiple of the time to transmit one of said cells, said method comprising the steps of:

setting a variable CREDIT equal to its previous value plus the difference between a current clock time $T_{NOW}$ and a previous clock time $T_{LAST}$, said difference expressed in units of the time to transmit one of said cells;

setting said variable CREDIT to the minimum of said variable CREDIT and said burst rate BURST;

comparing said variable CREDIT to said data rate RATE;

if said variable CREDIT is greater than or equal to said data rate RATE:

transmitting one data cell;

subtracting said data rate RATE from said variable CREDIT;

setting said previous clock time $T_{LAST}$ equal to the current clock time $T_{NOW}$;

determining whether there is more data to be transmitted;

if there is more data to be transmitted, repeating said step of comparing; and wherein said variables CREDIT, RATE and BURST are integers.

2. The method according to claim 1, wherein said data rate RATE is set to the inverse of the proportion of the total bandwidth allocated to the transmission of data from said data source.

3. The method according to claim 1, wherein said burst rate BURST is determined by multiplying said RATE by the maximum number of consecutive cells that are permitted to be transmitted.

* * * * *